July 12, 1932.   C. J. BAREIS   1,867,051
ADVERTISING SIGN
Filed July 17, 1930   3 Sheets-Sheet 1

Inventor
Charles J. Bareis
By Clarence A. O'Brien
Attorney

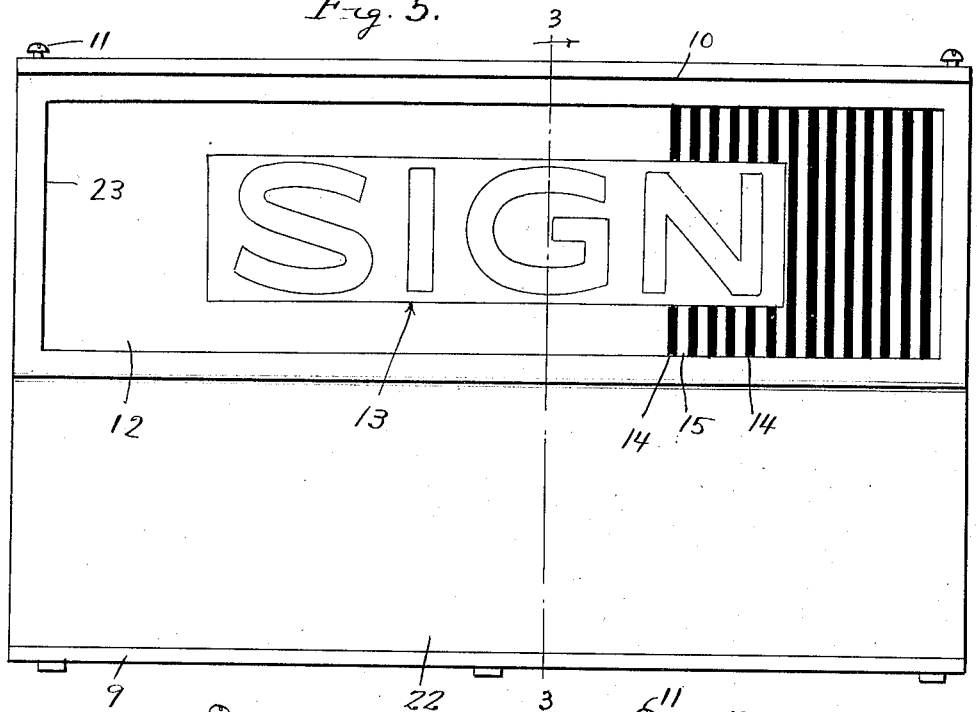
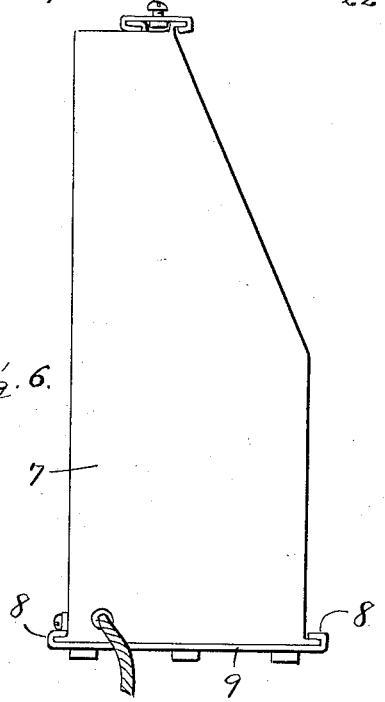
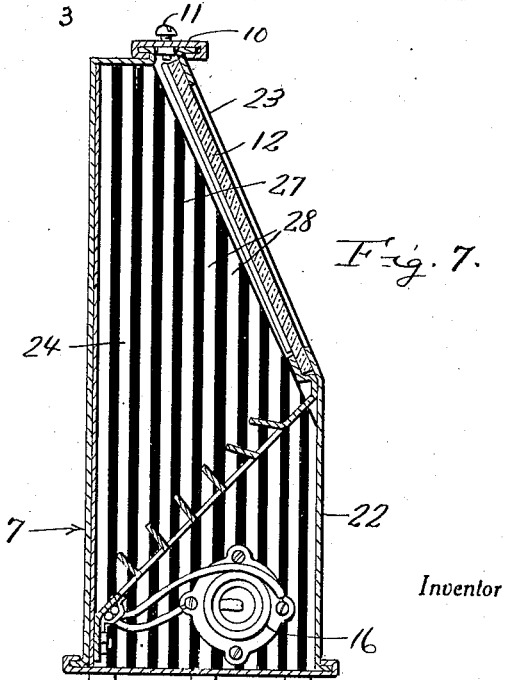

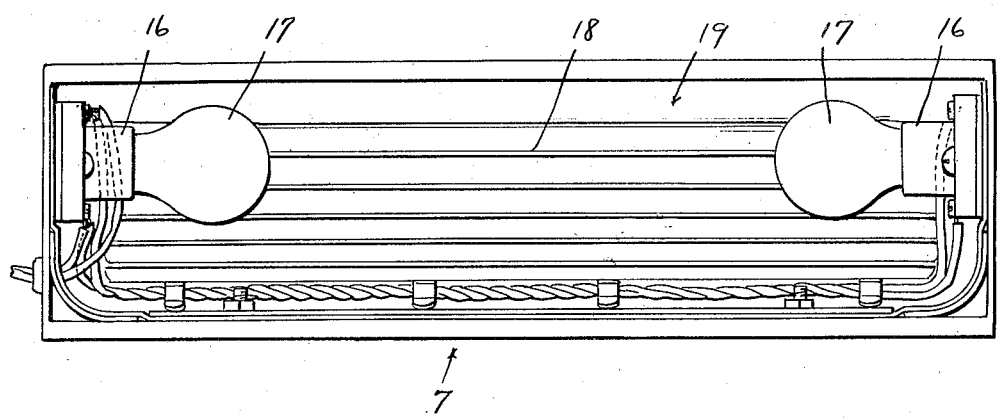
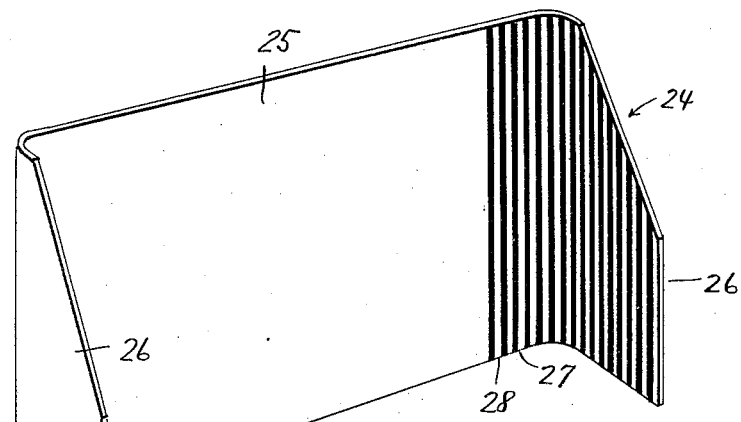
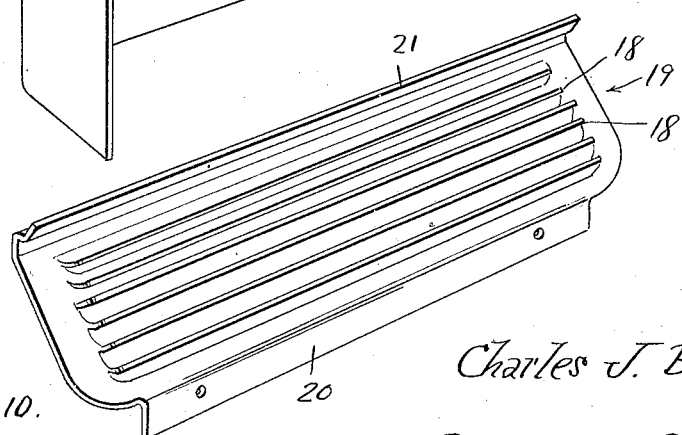

Patented July 12, 1932

1,867,051

UNITED STATES PATENT OFFICE

CHARLES J. BAREIS, OF MILWAUKEE, WISCONSIN

ADVERTISING SIGN

Application filed July 17, 1930. Serial No. 468,673.

This invention relates to advertising signs and particularly to advertising signs which employ the attention arresting qualities of optical illusions. The particular optical illusion employed in this invention is the well known "picket fence" illusion and is that produced when superposed screens, having optically coordinated lines thereon are either moved with respect to one another or are viewed from changing position. The illusion produced varies with the arrangement of the lines with respect to one another and the boundaries of the screens, with the character of the lines, their width, length, continuity, curvature and sequence, and the relative positions of the screens.

It is the object of this invention to produce practical means to utilize this optical illusion for advertising purposes by providing screens having the above mentioned effect placed one behind the other and bearing advertising indicia and either movable with respect to one another to produce the desired effect, or stationary and effective when an observing eye is on motion before it. Means may also be employed embodying a stationary screen bearing advertising indicia, and other movable or stationary screens in back of it to produce the desired illusion. It is to be understood however, that it is not desired to make the sign or indicia appear to move.

The screens may be of any construction which will either transmit or reflect light, or partly transmit and partly reflect light, or means may be employed which will alternately stop light and admit light at proper intervals on the surface of the screen or therethrough, to form the illusion producing lines or figures of the advertising indicia. These lines or figures may be of any conformation or curvature or they may be straight, angular, or varying in length, width or color. The screens themselves may have smooth, rough, stippled or rippled surfaces. Their cross sections may be plain, convex, concave, plano-convex, plano-concave, convex-concave, parabolic or any desired form, and the screens may be set in parallelism or at any desired angle with each other.

Both the front screens and the rearward screens may be movable with relation to each other or one may move and the other remain stationary, the idea being to produce not the illusion of a moving sign or indicia but of a fixed, non-traveling sign with a moving or traveling background.

I wish to have it understood that I do not intend to limit the application of this invention to any particular arrangement or means, but any means or materials may be employed and any changes made within the scope of the invention.

The objects of the invention, the nature thereof, the composition, and arrangement and combination of its parts will be clear to a person familiar with the art to which this invention relates upon considering the descriptions and explanations set out below in connection with the drawings illustrating one embodiment of the invention.

In the drawings of one physical embodiment of the principles set out above:—

Figure 5 is a front view of an illustrative embodiment of the invention.

Figure 6 is an end view.

Figure 7 is a transverse sectional view on the line 3—3 of Figure 5.

Figure 8 is a bottom view with the bottom cover removed from the device.

Figure 9 is a perspective view of the rear screen.

Figure 10 is a perspective view of the light distributor.

Figure 4:
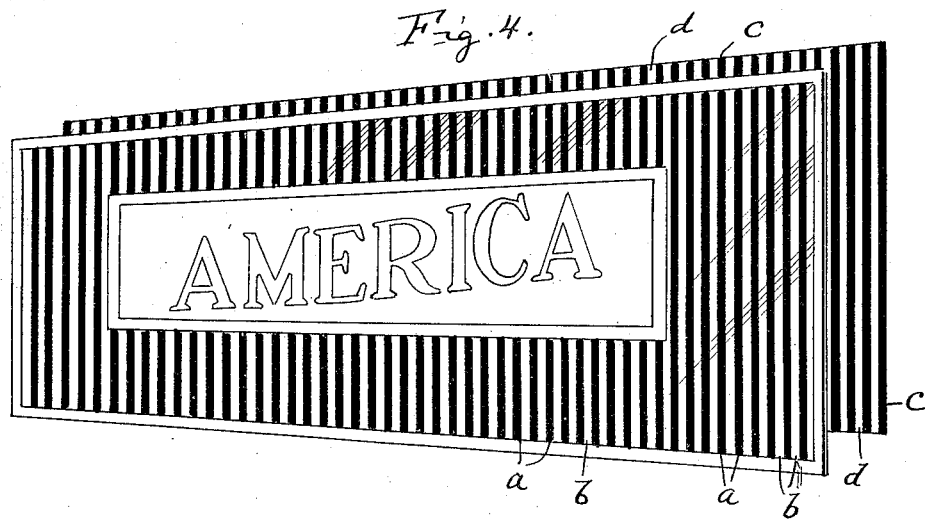
Figure 4 is a front perspective view of the disposition of the screens.
Figure 1:
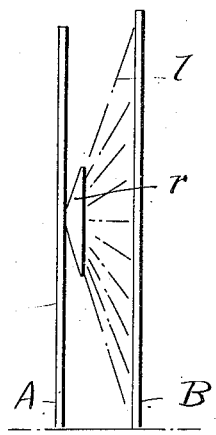
Figure 1 is an end schematic diagram of plane screens placed in parallel relation with each other.
Figure 2:
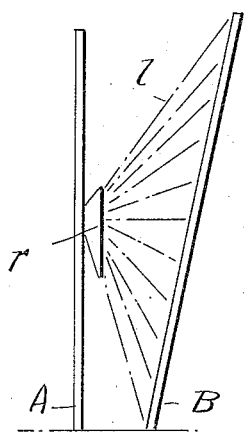
Figure 2 is a similar view showing plane screens in angular relation.
Figure 3:
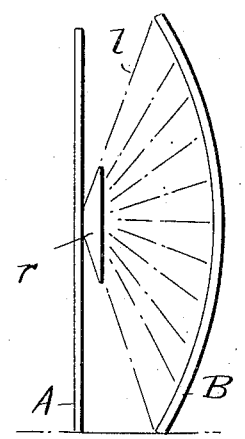
Figure 3 is a similar view showing one of the screens plane and the other concave.

Referring to the drawings in detail, in Figure 1, is diagrammed a front screen or panel A bearing the advertising indicia and a series of vertical spaced stripes $a$ bounding transparent spaces $b$, said screen or panel spaced from a rear opaque reflecting panel B having corresponding stripes and spaces c and d respectively. These panels A and B are so spaced in relation to each other that a stationary person viewing the advertising from the front would see only the indicia and an uninterrupted back ground which is produced by the stripes covering the spaces. However, upon moving from its fixed position the eye would receive the illusion that the back ground is moving or traveling relative to the advertising indicia. In Figure 1 the panels A and B are in spaced parallelism and a reflector having rear panel illuminating means therein is diagrammed at r adapted to define, diffuse or otherwise modify the beams of light l incident upon the panel B. Figure 2 diagrams similarly the placement of the panel B at an angle to the panel A. Figure 3 diagrams the use of a convex shape of the panel B. In Figures 1, 2, 3 and 4 the advertising indicia is placed on the panel A.

The preferred embodiment used herein as an illustration of the invention comprises a casing or lamp box 7. This may be of any appropriate form, having an open bottom having outward flanges for accommodation of channel members 8 of a bottom cover plate 9. There is a slot on the top of the casing along the marginal edges of which are outstanding flanges to receive channel guides on a removable slide cover 10 held in place by retaining screws 11. The purpose of said slot and cover is to permit insertion or removal of the front panel or lens 12. The panel is of general rectangular form and is provided with a centralized sign area 13. As shown in Figure 5 the panel is also provided with alternate black lines 14 and intermediate white stripes or spaces 15. This alternate arrangement of black and white stripes or of black stripes and intervening transparent spaces may be provided by painting or otherwise.

In the bottom compartment of the casing or lamp box are sockets 16 accommodating electric bulbs 17, which are disposed below a light distributor 19 having the slots defined by projecting louvers or fins 18. The distibutor 19 is substantially rectangular and is provided with a projecting longitudinal flange 20 for attaching it to the rear wall of the casing. The other and upper longitudinal edge of the distributor is fashioned at 21 to form a seat for the lower edge portion of the panel 12 as seen in Figure 7. The upper portion of the casing front wall is slanted rearwardly and is formed with an opening 23 whose edge portions surround and retain the surface of the panel 12, as seen in Figure 7. The device 19 serves to diffuse the light from the bulbs and direct it against the reflector panel surface 24. The effective reflecting surface of this panel 24 is provided with vertical stripes 27 and intervening spaces 28, which cooperate with the stripes 14 and spaces 15 of the front panel 12 in producing the illusion that the back ground thus formed for an advertising indicia area 13 on the panel 12 is traveling or moving with respect to said indicia area, thus attracting the attention of persons passing by the device. Of course, it is understood that any type of line and figure may be used as previously stated, but this embodiment serves to disclose the nature and objects of the invention. It is obvious that a variety of panels 12 and 25 may be simply interchanged for different effects.

Thus it will be understood that I have provided a novel advertising means very effective for the purpose for which it is intended, and which accomplishes its purpose in an attractive, efficient and novel manner, and which it is inexpensive and economical to manufacture, and operate, and very accessible for replacement and repairs.

I claim:—

1. An advertising device of the class described comprising a casing including a transparent panel in the upper part thereof bearing advertising indicia and vertical opaque stripes thereon and transparent spaces therebetween, an opaque panel behind and spaced from said transparent panel having unbroken vertical spaced stripes extended there across, said opaque panel being angularly spaced from said transparent panel, lighting means between said panels and below the transparent panel.

2. A structure of the class described, comprising a casing, a transparent panel angularly mounted in an upper part of the front of the casing and having a sign, and longitudinally spaced vertically disposed alternate spaced stripes, and an area on the interior and the back of said casing provided with alternate light and dark stripes for cooperating with said first named stripes and the spaces in producing an optical illusion, the said transparent panel being disposed at an angle to the said area, and said area extending on the back and sides of the interior of the casing.

3. An advertising sign of the class described comprising a casing an area on the interior thereof provided with vertical alternating stripes of light and dark color, said casing having a sight opening in the upper part thereof, a lens disposed in said sight opening provided with a sign and a plurality of vertical alternating stripes of different optical density for cooperation with said first named stripes, and a source of illumination between said area and the lens and below the lens, said area extending on the back and sides of the interior of the casing.

4. An advertising sign of the class described comprising a casing, an area on the interior of the casing provided with vertical alternating stripes with spaces therebetween, said casing having a sight opening in the upper part of the front thereof, a lens angularly disposed in said sight opening provided with a sign and a plurality of alternating stripes of different optical effect for cooperation with said first named stripes, said area constituting a reflector, and artificial illuminating means in said casing between said lens and the reflector and below said lens, the lens being vertically shorter than said area.

5. An advertising sign of the class described, comprising a lamp box provided at its front wall with an angularly disposed sight opening, a lens mounted in said sight opening provided with a sign and longitudinally spaced alternate vertically disposed stripes of different optical density, a reflector in said casing having alternating stripes and spaces cooperating with said first named stripes, sockets in the sides of said casing and below the lens, lamps mounted in said sockets, and a spreader plate in the casing above said sockets and provided with louver equipped slots for diffusing and spreading the light from said lamps against said reflector, said reflector comprising the interior of the sides and the back of said casing, and said spreader plate extended completely across the casing and at an angle to said lens.

In testimony whereof I affix my signature.

CHARLES J. BAREIS.